US007009659B2

(12) United States Patent
Dew et al.

(10) Patent No.: US 7,009,659 B2
(45) Date of Patent: Mar. 7, 2006

(54) SYSTEM AND METHOD FOR ESTABLISHING TV SETTINGS

(75) Inventors: Aaron Dew, San Diego, CA (US); Greg Gudorf, San Diego, CA (US); Anthony Lionel Creed, San Diego, CA (US); Matthew Chang, San Diego, CA (US); William Hausch, Culver City, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 536 days.

(21) Appl. No.: 10/000,381

(22) Filed: Oct. 29, 2001

(65) Prior Publication Data
US 2003/0107675 A1     Jun. 12, 2003

(51) Int. Cl.
*H04N 5/44* (2006.01)
(52) U.S. Cl. .................. 348/553; 348/569; 348/571
(58) Field of Classification Search ............... 348/569, 348/553, 714, 571, 730, 725, 731; 706/908, 706/909
See application file for complete search history.

(56) References Cited

U.S. PATENT DOCUMENTS

| 3,818,352 | A | * | 6/1974 | Moran ..................... 455/172.1 |
| 4,451,849 | A | * | 5/1984 | Fuhrer ........................ 348/602 |
| 5,343,251 | A | * | 8/1994 | Nafeh ......................... 348/571 |
| 5,566,237 | A | * | 10/1996 | Dobbs et al. ............... 381/103 |
| 5,977,964 | A | * | 11/1999 | Williams et al. ............ 345/721 |
| 6,067,570 | A | * | 5/2000 | Kreynin et al. ............. 709/227 |
| 6,553,355 | B1 | * | 4/2003 | Arnoux et al. ................ 706/13 |
| 6,690,351 | B1 | * | 2/2004 | Wong .......................... 345/156 |
| 6,822,695 | B1 | * | 11/2004 | Lee et al. ................... 348/603 |
| 2002/0021373 | A1 | * | 2/2002 | Shibamiya .................. 348/734 |
| 2002/0168010 | A1 | * | 11/2002 | Ali ......................... 375/240.26 |

FOREIGN PATENT DOCUMENTS

JP          07202641 A    *   8/1995

* cited by examiner

*Primary Examiner*—Victor R. Kostak
(74) *Attorney, Agent, or Firm*—John L. Rogitz

(57) ABSTRACT

A system and method for automatically establishing TV audio/video/closed captioning, based on time/date/geographic location/location of the TV within the home.

28 Claims, 1 Drawing Sheet

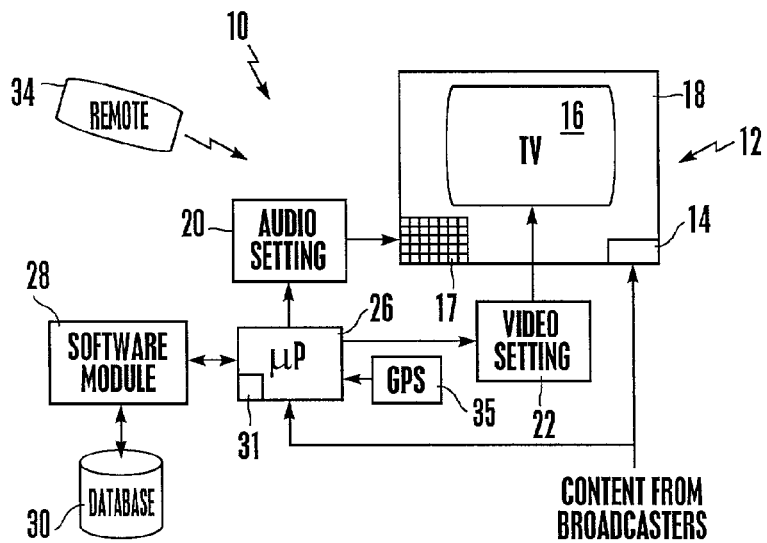
Figure 1
Figure 2
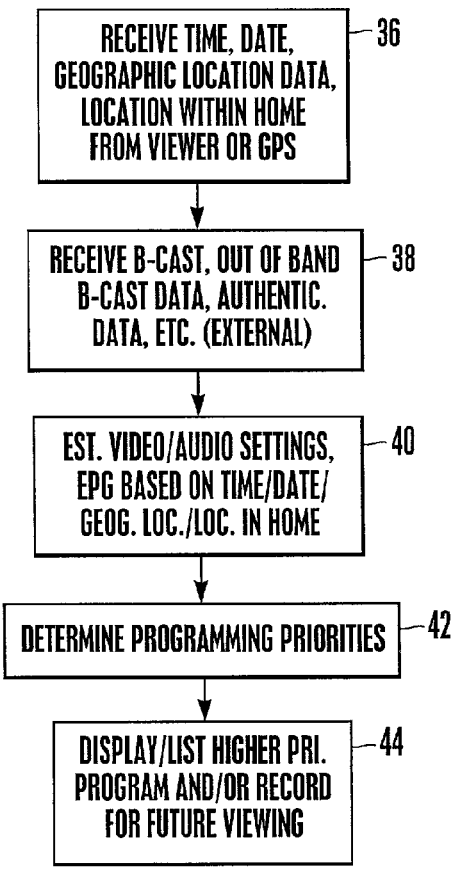

SYSTEM AND METHOD FOR ESTABLISHING TV SETTINGS

BACKGROUND OF THE INVENTION

1. Field of the Invention

The present invention relates generally to television systems.

2. Description of the Related Art

Televisions and computers have become ubiquitous, and since both usually entail a visual display, efforts have been made to integrate both functions into a single system. In this way, a consumer need not purchase and operate two separate systems, which can burden some consumers who, while familiar with operating a television and its remote control, might not be familiar with operating, e.g., an Internet computer.

To the extent that attempts have been made to combine television with Internet features, it has generally been with the focus of producing what might be thought of as a "lean forward" system. That is, hybrid TV/computers have typically been more oriented toward productivity, generally thought of as a computer system characteristic, and less toward entertainment ("lean back"), generally regarded as a television system characteristic. It is not just the dichotomy between productivity and entertainment that distinguishes a "lean forward" experience from a "lean back" experience, however. As contemplated herein, "lean forward" activities often are experienced by only a single person, while "lean back" activities are often group experiences. Moreover, "lean back" activities can extend to purchasing products that are advertised on TV, as opposed to, e.g., making products for sale. In any case, with the above-mentioned critical observation of the present invention in mind, it can readily be appreciated that the differences between a system designed for "lean forward" experiences and a system designed for "lean back" experiences can be both subtle and profound.

An example of a "lean forward" system is the system known as "WebTV", in which preselected Internet pages are loaded once into a television during manufacture and never subsequently updated, with the preselected pages being accessible through the television using a computer keyboard with its attendant complexity. To access the pages, the consumer must access a central site by means of the keyboard, and then be redirected to a desired Web page. In terms of currently expected speeds of Internet access, this consumes an undue amount of time. Furthermore, it requires browser or browser-like operations that must be executed by a consumer. All of these features—use of a keyboard, knowledgeable use of a browser, and wait time for Web page access—are not per se unacceptable for a lean forward experience, but would severely detract from a lean back experience.

For instance, in the context of lean back, entertainment- and group-oriented experiences, consumers are accustomed to using a much simpler input device than a computer keyboard, namely, a remote control. Moreover, a user interface that is simpler than a Web browser, e.g., an electronic program guide (EPG), is preferred. Also, waiting for entertainment to load or otherwise be prepared for playing is distracting in a lean-back, group-oriented experience. But as exemplified above by the WebTV system, current systems that attempt to integrate television and computers essentially do so by grafting a TV onto what is essentially an underlying, lean forward computer system, and consequently provide less than optimum lean back experiences. As an example, a large number of potential TV settings are available, and unlike a computer user who might expect to alter computer settings frequently based on the task at hand, a TV viewer might not want to laboriously establish each one every time viewing circumstances change. The object of the present invention is to provide a TV system that accommodates lean back experiences better than existing systems.

SUMMARY OF THE INVENTION

A system for automatically establishing TV settings based on a geographic location of a TV, a location of a TV with respect to a dwelling, and/or a date or time includes a TV and a processor coupled to the TV. The processor receives location and/or time information and, preferably using a set of heuristically-discovered rules, establishes one or more TV settings based thereon.

In a preferred implementation, the information is input by a viewer of the TV, or it is received from a wide area data source, such as but not limited to a global positioning satellite. The settings that are established based on TV location and time include video settings such as contrast, color, and tint or audio settings such as volume, audio dynamic range, audio treble, bass, EQ, or surround sound. Or, the processor can determine whether or not to display closed captioning based on the information. Settings that are manually input or changed by a viewer can be used to alter the heuristics.

In another aspect, a method for establishing settings on a TV based on location of the TV and/or time includes providing a set of correlation heuristics. Also, the method includes receiving an input including the location and/or the time. The set of correlation heuristics is accessed to correlate the input to the setting.

In still another aspect, a system for tailoring TV settings to a TV location and/or a time includes means for inputting the location and/or time to establish an input, and means for correlating the input to at least one setting that is associated with the TV. Means then establish the setting on the TV.

BRIEF DESCRIPTION OF THE DRAWINGS

The details of the present invention, both as to its structure and operation, can best be understood in reference to the accompanying drawings, in which like reference numerals refer to like parts, and in which:

FIG. 1 is a block diagram of the system of the present invention; and

FIG. 2 is a flow chart of the present logic.

DETAILED DESCRIPTION OF THE PREFERRED EMBODIMENTS

Referring initially to FIG. 1, a system is shown, generally designated 10.

As shown, the system 10 includes a TV 12 that conventionally receives televised content at a content receiver 14 (e.g., an antenna, satellite dish, set-top box, etc.) for display of the content on a monitor 16 and associated speakers 17.

While the embodiment below discusses a TV 12 with a single housing that is shown separate from the microprocessor and database, it is to be understood that the term "television" encompasses any apparatus that has a television tuner and the below-described capability in a single housing or in separate housings that cooperate together. For instance, the term "TV" encompasses the television system shown in FIG. 1, as well as a conventional television in combination with a set-top box that functions in accordance with the present invention. In the latter example, the set-top box might include, e.g., the microprocessor discussed below.

In the preferred non-limiting embodiment shown, the TV 12 includes a housing 18 that holds a conventional television tuner which receives the TV signals. The audio and video settings of the TV, i.e., the volume, tone, tint, color, contrast, and so on as conventionally provided in the art, are established by respective adjustable audio and video setting circuits 20, 22. Also, the TV 12 can display an electronic program guide (EPG) for displaying, on the monitor 16, a list of available TV channels in accordance with principles known in the art.

A microprocessor 26 communicates with the circuits 20, 22 and the EPG for establishing television settings based on one or more of time, date, geographic location of the TV 12, and location within the home of the TV 12, as set forth more fully below. As intimated above, the microprocessor 26 can be located in the housing 18 or it can be disposed elsewhere, such as in a set-top box, remote control device. In any case, the microprocessor 26 accesses a software-implemented settings module 28 to execute the logic set forth herein. The microprocessor 26 can also access a database 30 of information for correlating time/date/location information to audio/video settings. The database 30 can be contained in computer memory, or on a hard disk drive, optical drive, solid state storage, tape drive, removable flash memory, or any other suitable data storage medium. Moreover, the microprocessor 26 accesses or includes a clock 31, so that the microprocessor can determine the time of day for purposes to be shortly disclosed. The system 10 can also have a TV remote control device 34 that functions in accordance with principles known in the art and as set forth herein. A locater system 35 such as a GPS can also communicate with the microprocessor 26.

It may now be appreciated that the microprocessor 26 controls the functions of the TV 12 in accordance with the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Now referring to the logic diagram shown in FIG. 2, the settings module 28 can adjust TV 12 settings based on time of day, and/or date, and/or geographic location of the TV 12, and/or location of the TV 12 within the home. Specifically, at block 36 the microprocessor 26 can receive time, date, geographic location, and location within the home of the TV 12 from the viewer by means of the remote device 34 or other input device, or from the locater 35. When received from the viewer, the module 28 can cause a menu to be displayed on the TV 12 listing, e.g., locations within the home, for example, "bedroom", "bathroom", "living room", "baby's room", and so on. Date, time, and geographic location can also be listed. The viewer can then select the appropriate entry.

Proceeding to block 38, some or all of the information discussed above can be received from an external source, such as a broadcaster, Internet connection, global positioning system (GPS) satellite, etc. Accordingly, time/date/location information can be received in broadcast content (e.g., in the vertical blanking interval), or via out of band broadcast content, such as Internet content or Radio Data Service (RDS) content or telephone modem content or as part of transmitted authentication data to, e.g., a set top box.

In any case, based on the time/date/location information received at blocks 36 and/or 38, the logic flows to block 40, wherein the microprocessor 26 establishes one or more of the audio settings and video settings based thereon.

To do this, the microprocessor 26 executes the settings module 28 to invoke heuristically determined rules. As can be appreciated, a wide range of subjective heuristics can be employed and updated in the database 30 via, e.g., cable or Internet connection to, e.g., automatically adjust the video circuit 22 to establish one or more of color, tint, hue, brightness, contrast, and so on according to the heuristics.

By further way of non-limiting examples only, low volume and brighter contrast and/or displaying closed captions (or not) might be correlated to a baby's room TV in the morning. As another example, in the morning the volume of the TV 12, if located in the kitchen, might be automatically set relatively high.

Still further, the viewer can manually change the TV settings by, e.g., appropriately manipulating the remote control device 34. In such an embodiment, the microprocessor 26 can present, on the monitor 16, a menu listing available settings and highlighting the actual settings as automatically established by the microprocessor 26, and the viewer can scroll through the menu and select other TV settings, if desired. These viewer-selected settings can in turn be correlated with contemporaneous time/date/location signals and the database 30 updated, or "trained", accordingly. For example, if the same time/date/location signal (or signal range) is sensed two or more times contemporaneously with a manually-input setting, the signal (or range) can be correlated to the setting in the database 30. In this way, the heuristics that are correlated to particular settings can be altered, or vice-versa.

Also, TV menu color schemes and TV menu icon schemes can be established based on the time/date/location. Audio settings that can be established include but are not limited to audio dynamic range, audio treble, bass, EQ, and surround sound. Also, the processor 26 can determine whether or not to display closed captioning based on the time/date/position information.

While the particular SYSTEM AND METHOD FOR ESTABLISHING TV SETTING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A system for automatically establishing at least one TV setting based on at least one of: a geographic location of a TV, a location of a TV with respect to a dwelling, and a time, comprising:
   a TV; and
   a processor coupled to the TV and receiving information representative of at least one of: a geographic location of a TV, a location of a TV with respect to a dwelling, and a time, the processor establishing at least one of: an audio setting, and a video setting based at least partially thereon, the audio setting being selected from the group consisting of audio volume, audio dynamic range, audio treble, audio bass, audio EQ, and surround sound, the video setting being selected from the group consisting of menu color, brightness, contrast, color, and tint, wherein the information is received via a global positioning satellite.

2. The system of claim 1, wherein the information is input by a viewer of the TV.

3. The system of claim 1, wherein the setting is a video setting.

4. The system of claim 1, wherein the setting is an audio setting.

5. The system of claim 1, wherein the setting is a menu color.

6. The system of claim 3, wherein the setting is at least one of: contrast, color, and tint.

7. A system for automatically establishing at least one audio or video TV setting based on a location of a TV with respect to a dwelling, comprising:
   a TV; and
   a processor coupled to the TV and receiving information from a satellite representative of a location of a TV with respect to a dwelling, the processor establishing at least one of: an audio setting, and a video setting based at least partially thereon.

8. The system of claim 7, wherein the setting is volume.

9. The system of claim 7, wherein the processor accesses a set of heuristics to undertake the establishing act.

10. The system of claim 7, further comprising an input device manipulable to establish the settings.

11. The system of claim 10, wherein manually input settings are used by the processor to alter heuristics.

12. A method for establishing at least one audio and/or video setting on a TV based on at least one of: location of the TV, and time, comprising:
   providing a set of correlation heuristics;
   receiving an input comprising at least one of: the location, and the time; and
   accessing the set of correlation heuristics to correlate the input to the setting, wherein the setting is a menu icon scheme.

13. The method of claim 12, wherein the location is a location of the TV within a building.

14. The method of claim 12, wherein the location is a geographic location of the TV.

15. The method of claim 12, wherein the time is a time of day.

16. The method of claim 12, wherein the time is a date.

17. The method of claim 12, wherein the input is received from a viewer of the TV.

18. The method of claim 12, wherein the input is received from a global positioning satellite.

19. A system for tailoring TV settings to a TV location, comprising:
   means for inputting the location to establish an input, the location being received from a satellite;
   means for correlating the input to at least one setting associated with the TV; and
   means for establishing at least one of: an audio setting, and a video setting selected from the group consisting of menu color, color, tint, brightness, and contrast, on the TV.

20. The system of claim 19, wherein the means for inputting is a human-manipulable TV control device associated with the TV.

21. The system of claim 19, wherein the means for inputting is a wide area source of data.

22. The system of claim 19, wherein the means for correlating is a processor located in the TV.

23. The system of claim 19, wherein the means for correlating is a processor located in a set-top box associated with the TV.

24. The system of claim 19, wherein the setting is at least one video setting.

25. The system of claim 19, wherein the setting is at least one audio setting.

26. The system of claim 3, wherein the processor determines whether to display closed captioning based on the information.

27. The system of claim 4, wherein the setting is an audio dynamic range.

28. The system of claim 4, wherein the setting is at least one of: audio treble, bass, EQ, or surround sound.

* * * * *